April 21, 1925.  E. E. BOUCHARD  1,534,903
RADIATOR AND HOOD COVER FOR AUTOMOBILES
Filed Nov. 9, 1922
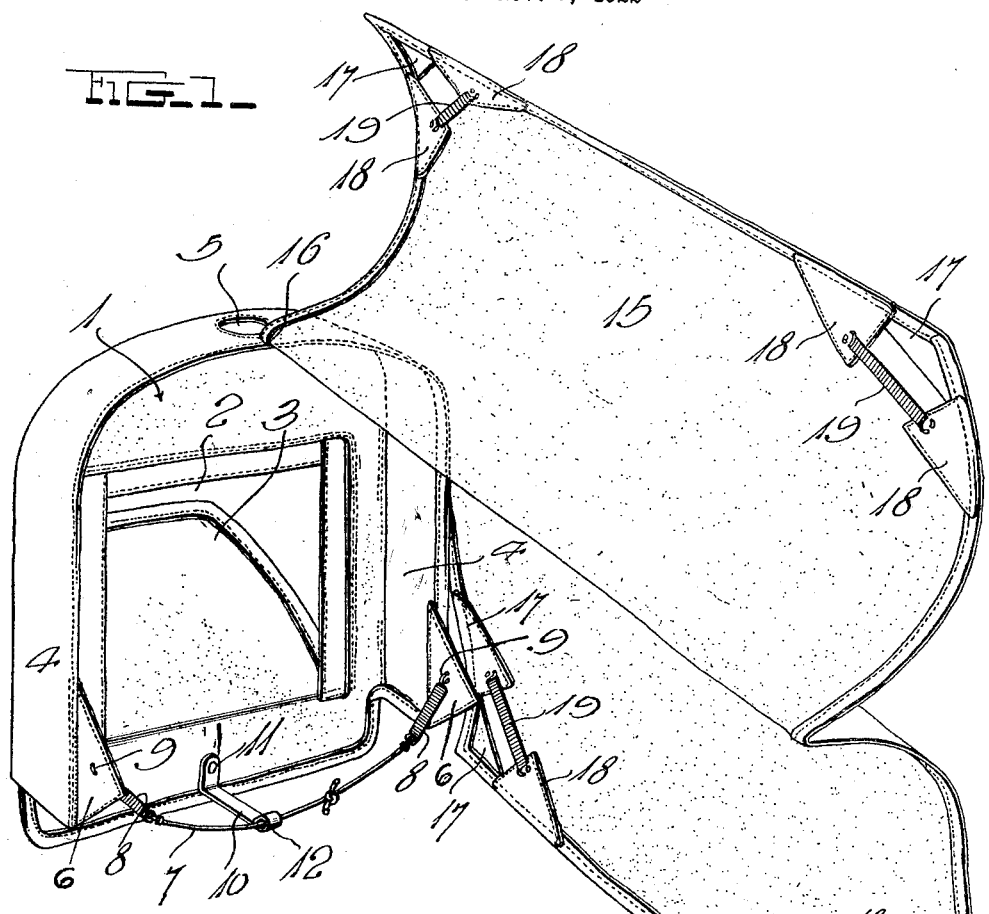
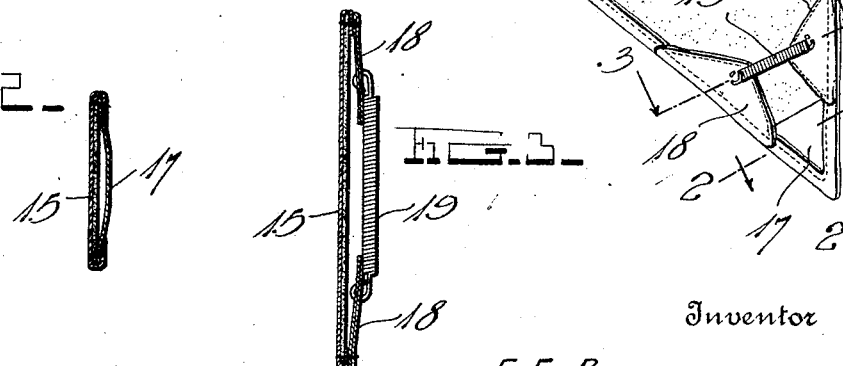
Witness
H. Woodard
Inventor
E. E. BOUCHARD
By H. R. Wilson Yeo
Attorneys Patented Apr. 21, 1925.

1,534,903

UNITED STATES PATENT OFFICE.

EMILE EGIDE BOUCHARD, OF BURLINGTON, VERMONT.

RADIATOR AND HOOD COVER FOR AUTOMOBILES.

Application filed November 9, 1922. Serial No. 599,876.

*To all whom it may concern:*

Be it known that I, EMILE E. BOUCHARD, a citizen of the United States, residing at Burlington, in the county of Chittenden and State of Vermont, have invented certain new and useful Improvements in Radiator and Hood Covers for Automobiles; and I do declare the following to be a full, clear, and exact description of the invention, such as will enable others skilled in the art to which it appertains to make and use the same.

My invention relates to improvements in covers for automobile radiators and hoods and has for its object to provide improved means for securing the cover in a tightly stretched condition over the hood and radiator.

With the foregoing in view, the invention resides in the novel subject matter hereinafter described and claimed, the description being supplemented by the accompanying drawing.

Figure 1 is a perspective view of a radiator and hood cover constructed in accordance with my invention.

Figures 2 and 3 are detail sectional views as indicated by lines 2—2 and 3—3 of Fig. 1.

In the drawings above briefly described, the numeral 1 designates a cover for the front side of an automobile radiator, said cover having the usual opening 2 which may be closed to any desired extent by the flexible flap 3. A flange-like portion 4 extends rearwardly from the cover 1 to extend over the top of the radiator and down the sides thereof, the upper portion of the part 4 being formed with an opening 5 to receive the neck of the radiator. The rear edge of the flange-like portion 4 is provided with a pair of flexible flaps 6 adjacent the lower edge of the cover and adapted to fold inwardly at the back of the radiator, suitable means being provided for connection with these flaps to draw them inwardly towards each other, thereby stretching the cover over the radiator and holding it in a stretched condition. In the preferred form of construction, a cord 7 having coiled springs 8 at its ends, is provided for connecting the two flaps 6, said springs having hooks 9 to be engaged with said flaps after placing said springs under tension.

I prefer to secure a rearwardly extending guide 10 to the central portion of the lower end of the cover 1, by a rivet or the like 11, this guide being preferably formed from a single strip of metal having its rear end bent to form a guide eye 12. The guide 10 is intended to extend under the radiator and to receive the cord 7. It will thus be seen that this cord will incline from the guide across the lower corners of the radiator to the flaps 6, thereby pulling both inwardly and downwardly upon the sides of the cover and pulling rearwardly upon the front portion 1. Thus, the device is effectively held stretched.

The numeral 15 designates a cover or blanket for the automobile hood, the upper portion of this cover being connected in any suitable way with the radiator cover, as indicated at 16. The corners of the cover 15 are provided with pockets 17 at their inner sides adapted to receive the corners of the automobile hood and I also prefer to provide the edges of said cover 15 with flaps 18 adjacent the pockets, these flaps being connected by suitable straps which are preferably in the form of coiled springs 19 extending across the corners of the cover. This arrangement of parts serves to tightly stretch the cover 15 upon the automobile hood and holds it in a stretched condition.

By using the construction disclosed, or a substantial equivalent thereof, it will be clear that I have provided a cover which will remain in proper place and will present an unusually neat appearance, as it is tightly stretched and therefore lies flat at all points.

As excellent results may be obtained from the details disclosed, these details are preferably followed. It is to be understood however that within the scope of the invention as claimed, numerous minor changes may be made.

I claim:

1. A cover shaped to extend over an automobile hood and having pockets at its corners to receive the corners of the hood, flaps secured along one of their edges to the edges of said cover in spaced relation from the corners of said cover, said flaps extending inwardly across the back of said cover toward each other, and straps connecting said flaps.

2. A device of the class described comprising a cover to extend over one side of a part of an automobile, flaps secured to said cover and adapted to be extended inwardly toward each other around the other side of the part covered, and means connecting said flaps to secure the cover in place.

3. A device of the class described comprising a cover to extend over one side of a part of an automobile, flaps secured to said cover and adapted to be extended inwardly toward each other around the other side of the part covered, and an elastic connector having its ends connected to said flaps for drawing them inwardly to tightly stretch the cover.

4. A cover shaped to extend over an automobile hood, the edges of said cover having flaps adjacent its corners, and straps extending across said corners with their ends connected to said flaps.

5. A structure as specified in claim 4; said straps being of elastic nature and being under tension.

6. A cover shaped to extend over the front, sides and top of an automobile radiator and having an opening to receive the radiator filling neck, and adjustable and detachable means connected to the side portions of said cover for drawing them inwardly toward each other, said means being adapted to extend across the back of the radiator to hold the cover stretched over the radiator.

7. A cover shaped to extend over the front, sides and top of an automobile radiator and having an opening to receive the radiator filling neck, flaps on the rear edges of the side portions of said cover adapted to fold inwardly at the back of the radiator, means connected to said flaps for drawing them inwardly to secure the cover in place and means for exerting a downward stress on the central portion of said connection.

8. A cover shaped to extend over the front, sides and top of an automobile radiator and having an opening to receive the radiator filling neck, flaps on the rear edges of the side portions of said cover adapted to fold inwardly at the back of the radiator, and yielding means connected at its ends to said flaps for drawing them inwardly to secure the cover in place.

9. A cover shaped to extend over the front, sides and top of an automobile radiator and having an opening to receive the radiator filling neck, a guide carried by the lower end of the front portion of said cover, and a flexible connector engaged with said guide, said connector being adapted to extend across the lower corners of the radiator at the rear side thereof and to have its ends connected to the sides of the cover.

10. A structure as specified in claim 9; the sides of said cover having inwardly extending flaps to which the ends of said connector are intended to be connected.

In testimony whereof I have hereunto affixed my signature.

EMILE EGIDE BOUCHARD.